(12) United States Patent
Abe et al.

(10) Patent No.: US 11,405,551 B2
(45) Date of Patent: Aug. 2, 2022

(54) IMAGING APPARATUS

(71) Applicant: Panasonic Intellectual Property Management Co., Ltd., Osaka (JP)

(72) Inventors: Kazuya Abe, Osaka (JP); Yuichi Suzuki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 127 days.

(21) Appl. No.: 16/891,237

(22) Filed: Jun. 3, 2020

(65) Prior Publication Data

US 2021/0152740 A1 May 20, 2021

(30) Foreign Application Priority Data

Nov. 15, 2019 (JP) .............................. JP2019-206669

(51) Int. Cl.
 *H04N 5/232* (2006.01)
 *G06F 13/40* (2006.01)
 *H04N 5/907* (2006.01)

(52) U.S. Cl.
 CPC ..... *H04N 5/23241* (2013.01); *G06F 13/4068* (2013.01); *H04N 5/907* (2013.01)

(58) Field of Classification Search
 CPC . H04N 5/23241; H04N 5/907; G06F 13/4068
 See application file for complete search history.

(56) References Cited

U.S. PATENT DOCUMENTS

| 7,095,437 | B1 | 8/2006 | Hatakeyama | |
|---|---|---|---|---|
| 9,674,473 | B2* | 6/2017 | Fujihashi | H04N 5/23241 |
| 2008/0284855 | A1* | 11/2008 | Umeyama | H04N 1/00896 348/207.1 |
| 2016/0224097 | A1* | 8/2016 | Hirouchi | G06F 1/3287 |
| 2016/0381338 | A1 | 12/2016 | Liu | |

FOREIGN PATENT DOCUMENTS

| JP | 09-219806 A | 8/1997 |
|---|---|---|
| JP | H11-341408 A | 12/1999 |
| JP | 2017-520941 A | 7/2017 |
| JP | 2018-85658 A | 5/2018 |

* cited by examiner

*Primary Examiner* — Twyler L Haskins
*Assistant Examiner* — Fayez A Bhuiyan
(74) *Attorney, Agent, or Firm* — Renner, Otto, Boisselle & Sklar, LLP

(57) ABSTRACT

An imaging apparatus, for capturing a subject image and recording image data on a recording medium, includes: a recording medium connector configured to attach the recording medium detachably; a communication host connected to the recording medium connector via a first communication bus, configured to access the recording medium via the first communication bus to write data to the recording medium or read data from the recording medium; and a processor configured to control power supply, wherein in a case where a period in which the communication host does not access the recording medium is equal to or longer than a predetermined period, the processor stops power supply to the recording medium and the recording medium connector, and stops power supply to the communication host.

10 Claims, 9 Drawing Sheets

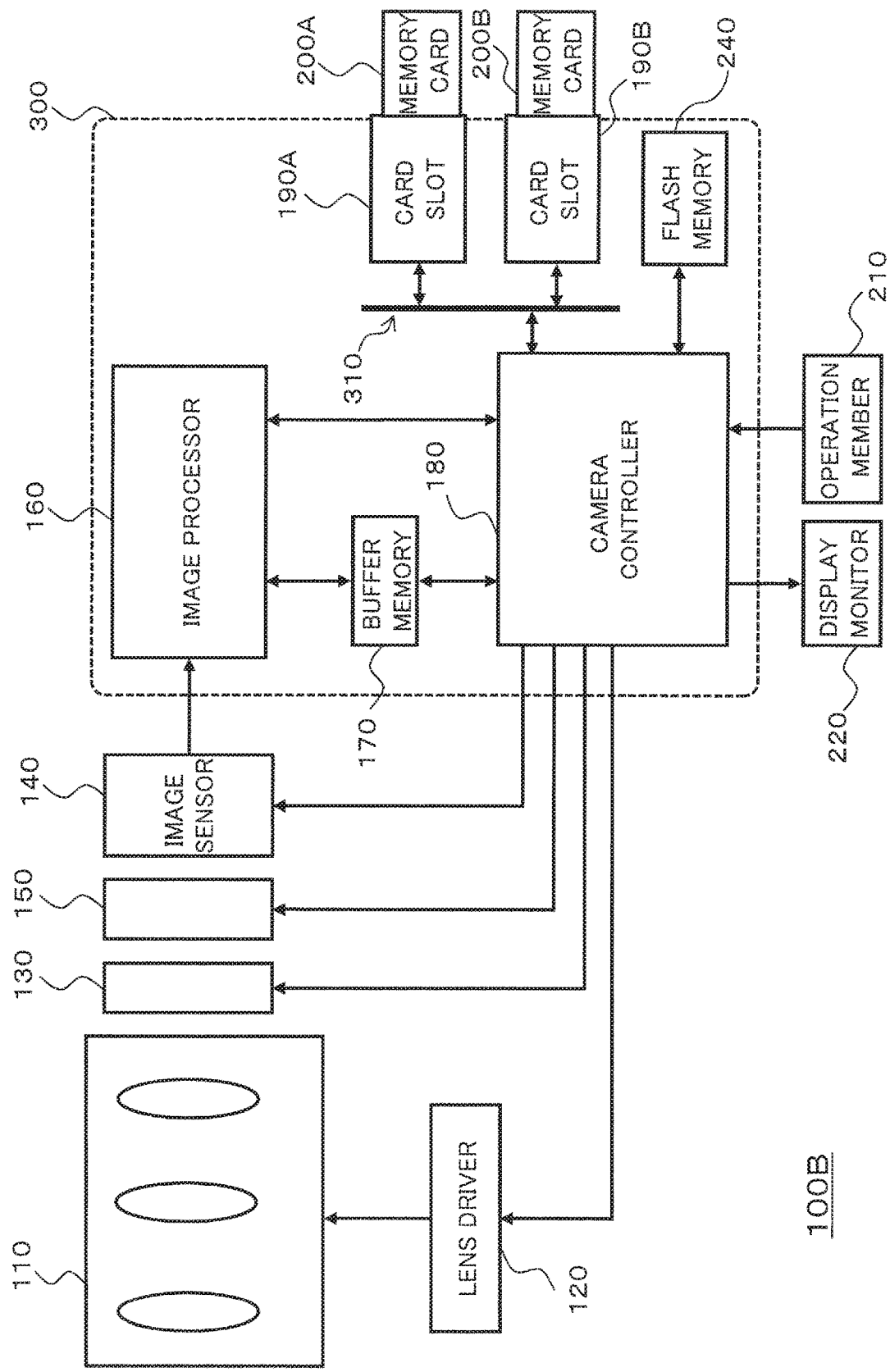

IMAGING APPARATUS

BACKGROUND

1. Technical Field

The present disclosure relates to an imaging apparatus to which a recording medium is attachable.

2. Related Art

JP H09-219806 A discloses an imaging apparatus intended to sufficiently reduce power consumption and increase operable time when a battery is driven, without putting the burden of power supply operation on a user. In this imaging apparatus, imaging control means and recording control means turn off imaging means and recording means during imaging standby as operation in a power saving mode. Thereafter, power-on control of the imaging means and the recording means is performed in response to operation of an imaging operation member, and thus imaging and recording operation can be performed. When a captured image is reproduced, power-off control of the imaging means is performed as operation in the power saving mode.

SUMMARY

The present disclosure provides an imaging apparatus capable of reducing power consumed in the imaging apparatus to which a recording medium is attachable.

An imaging apparatus according to an aspect of the present disclosure 1s an imaging apparatus configured to capture a subject image and record image data on a recording medium. The imaging apparatus includes a recording medium connector, a communication host, and a processor. The recording medium is configured to attach the recording medium connector detachably. The communication host is connected to the recording medium connector via a first communication bus, and configured to access the recording medium via the first communication bus to write data to the recording medium or read data from the recording medium. The processor is configured to control power supply. The processor stops power supply to the recording medium and the recording medium connector, and stops power supply to the communication host, in a case where a period in which the communication host does not access the recording medium is equal to or longer than a predetermined period.

In an imaging apparatus according to another aspect of the present disclosure, the predetermined period is longer than a continuous shooting interval at which image data is shot continuously.

According to an imaging apparatus of the present disclosure, it is possible to reduce power consumed in the imaging apparatus to which a recording medium is attachable.

BRIEF DESCRIPTION OF THE DRAWINGS

FIG. 9 shows a second modification of the configuration of the digital camera.

DETAILED DESCRIPTION

Hereinafter, embodiments will be described in detail with reference to the drawings as appropriate. However, more detailed description than necessary may be omitted. For example, detailed description of already well-known matters and repeated description of substantially the same configuration may be omitted. This is to prevent the following description from being unnecessarily redundant and to allow a person skilled in the art to easily understand the present disclosure. Note that the applicant provides the accompanying drawings and the following description in order for a person skilled in the art to fully understand the present disclosure, and does not intend to limit a subject matter recited in claims.

First Embodiment

In a first embodiment, a digital camera to which a memory card is attachable will be described as an example of an imaging apparatus according to the present disclosure.

1. Configuration

A configuration of the digital camera according to the first embodiment will be described with reference to FIG. 1.

Figure 1:
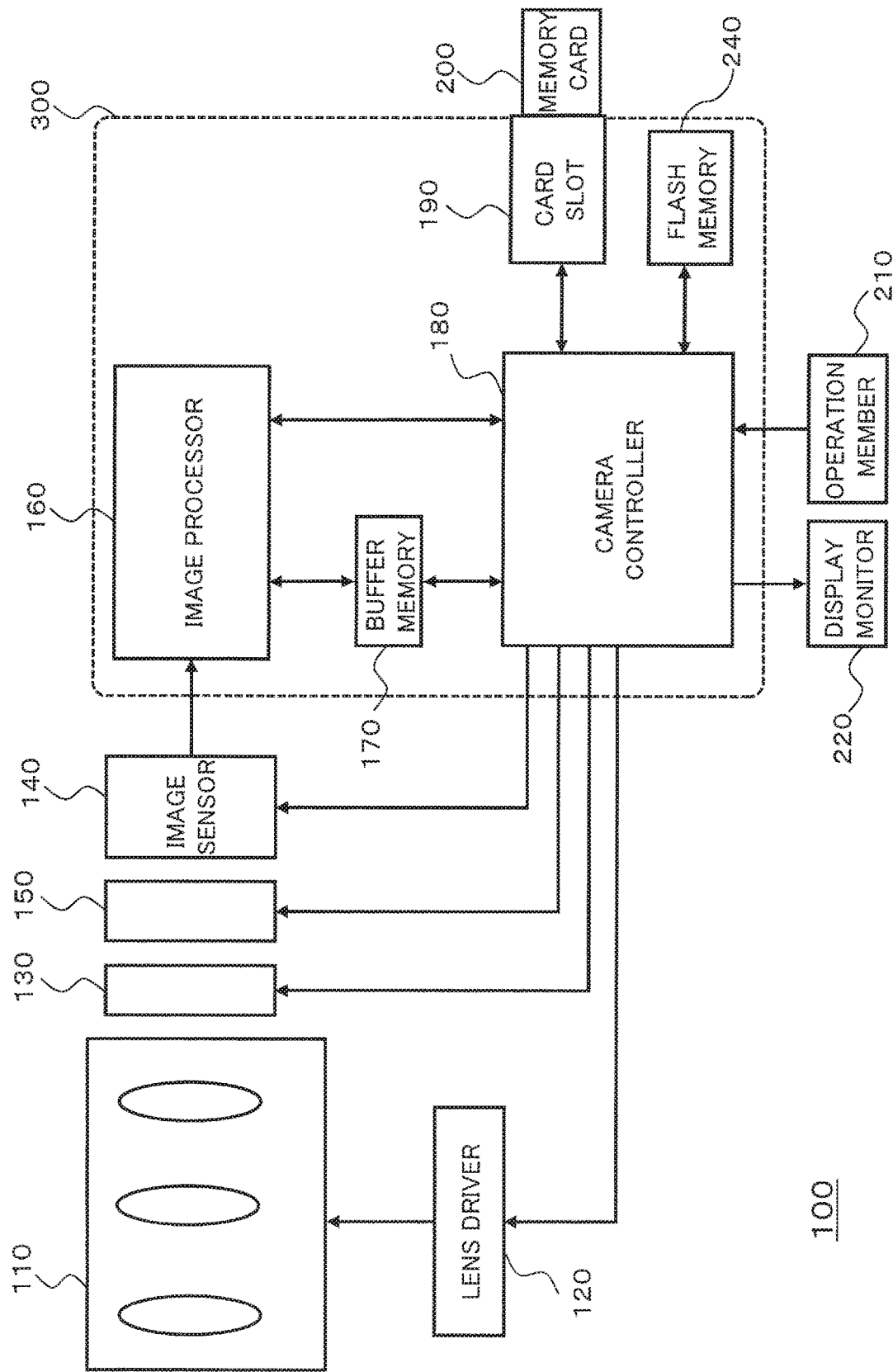
FIG. 1 shows a configuration of a digital camera according to a first embodiment of the present disclosure.

FIG. 1 shows a configuration of a digital camera 100 according to this embodiment. The digital camera 100 according to this embodiment includes an optical system 110, a lens driver 120, a diaphragm 130, and an image sensor 140. The digital camera 100 further includes a shutter 150, an image processor 160, a buffer memory 170, a camera controller 180, an operation member 210, and a display monitor 220. The digital camera 100 further includes a flash memory 240 and a card slot 190.

The optical system 110 includes a zoom lens, a focus lens, and the like. The zoom lens is lens for changing magnification of a subject image formed by the optical system. The focus lens is a lens for changing a focus state of the subject image formed on the image sensor 140. The zoom lens and the focus lens include one or a plurality of lenses.

The lens driver 120 includes configurations for driving respective various lenses of the optical system 110, such as the focus lens. For example, the lens driver 120 includes a motor, and moves the focus lens along an optical axis of the optical system 110 under the control of the camera controller 180. The configuration for driving the focus lens in the lens driver 120 can be achieved by a DC motor, a stepping motor, a servo motor, an ultrasonic motor, or the like.

The diaphragm 130 includes, for example, an aperture diaphragm. The diaphragm 130 adjusts the size of an aperture automatically or in accordance with setting by a user who specifies an F value (diaphragm value) and the like, thereby adjusting an amount of light transmitted through the aperture. The optical system 110 and the diaphragm 130 are housed in a lens barrel (not shown).

The image sensor 140 captures a subject image incident through the optical system 110 and generates an image signal. The image signal includes information on an amount of light exposed in each pixel by the image sensor 140, and indicates an image as a capturing result. For example, the generated image signal is digitized through an AD converter (not shown), and is input to the image processor 160.

The image sensor 140 generates image data of a new frame at a predetermined frame rate (e.g., 30 frames/second). A generation timing of the captured data and electronic shutter operation in the image sensor 140 are controlled by the camera controller 180. The image sensor 140 can be various image sensors such as a CMOS image sensor, a CCD image sensor, and an NMOS image sensor.

The image sensor 140 performs capturing operation of a still image, capturing operation of a through image, and the like. The through image is mainly a moving image, and is displayed on the display monitor 220 in order for the user to determine a composition for capturing a still image. The image sensor 140 is an example of an imager in this embodiment.

The shutter 150 is means for blocking light transmitted through the image sensor 140. The shutter 150 includes, for example, a mechanical shutter such as a focal plane shutter or a lens shutter. The shutter 150 is driven at a shutter speed set by user operation or the like.

The image processor 160 performs predetermined processing on the image signal output from the image sensor 140 to generate image data, and performs various kinds of processing on the image data to generate an image to be displayed on the display monitor 220. Examples of the processing of the image processor 160 are white balance correction, gamma correction (inverse gamma processing), YC conversion processing, electronic zoom processing, compression processing, and expansion processing, but not limited thereto. The image processor 160 may include a hard-wired electronic circuit, or may include a microcomputer, a processor, or the like using a program.

The display monitor 220 is an example of a display that displays various kinds of information. For example, the display monitor 220 displays an image (through image) indicated by image data that is captured by the image sensor 140 and is subjected to image processing by the image processor 160. The display monitor 220 also displays a menu screen or the like for allowing the user to make various settings for the digital camera 100. The display monitor 220 can include, for example, a liquid crystal display device or an organic EL device.

The operation member 210 is a general term for operation members for receiving operation (instructions from the user. The operation member 210 includes buttons, levers, dials, touch panels, switches, and the like for receiving user operation. The operation member 210 also includes virtual buttons and icons displayed on the display monitor 220.

A memory card 200 is, for example, an XQD card or a CFexpress card, and adopts a PCI Express (abbreviated as "PCIe") standard as a data transfer interface communication standard. In this case, a PCIe standard data transfer interface is adopted for the card slot 190. The memory card 200 is an example of a recording medium in this embodiment.

The memory card 200 is attachable to the card slot 190, and the memory card 200 is accessed under the control of the camera controller 180. The digital camera 100 can record image data on the memory card 200 and read recorded image data from the memory card 200. The card slot 190 is an example of a recording medium connector in this embodiment.

The camera controller 180 controls the overall operation of the digital camera 100. The camera controller 180 uses the buffer memory 170 as a work memory during control operation and image processing operation.

The camera controller 180 includes a CPU or MPU, and the CPU or MPU executes a program (software) to achieve a predetermined function. The camera controller 180 may include a processor including a dedicated electronic circuit designed to achieve the predetermined function, instead of the CPU or the like. That is, the camera controller 180 can be achieved by various processors such as a CPU, an MPU, a GPU, a DSU, an FPGA, and an ASIC. The camera controller 180 may include one or a plurality of processors.

The buffer memory 170 is a recording medium that functions as a work memory of the image processor 150 and the camera controller 180. The buffer memory 170 is achieved by a dynamic random access memory (DRAM) or the like. The flash memory 240 is a nonvolatile recording medium. For example, the flash memory 240 stores various data structures (described below) for managing an operation mode of the digital camera 100 in this embodiment. Each of the memories 170 and 240 is an example of a memory in this embodiment.

In the digital camera 100, for example, the card slot 190, the camera controller 180, the buffer memory 170, the image processor 160, and the flash memory 240 are mounted on a target board 300. Details of the configuration of the digital camera 100 will be described below.

1-1. Details of Configuration

Figure 2:
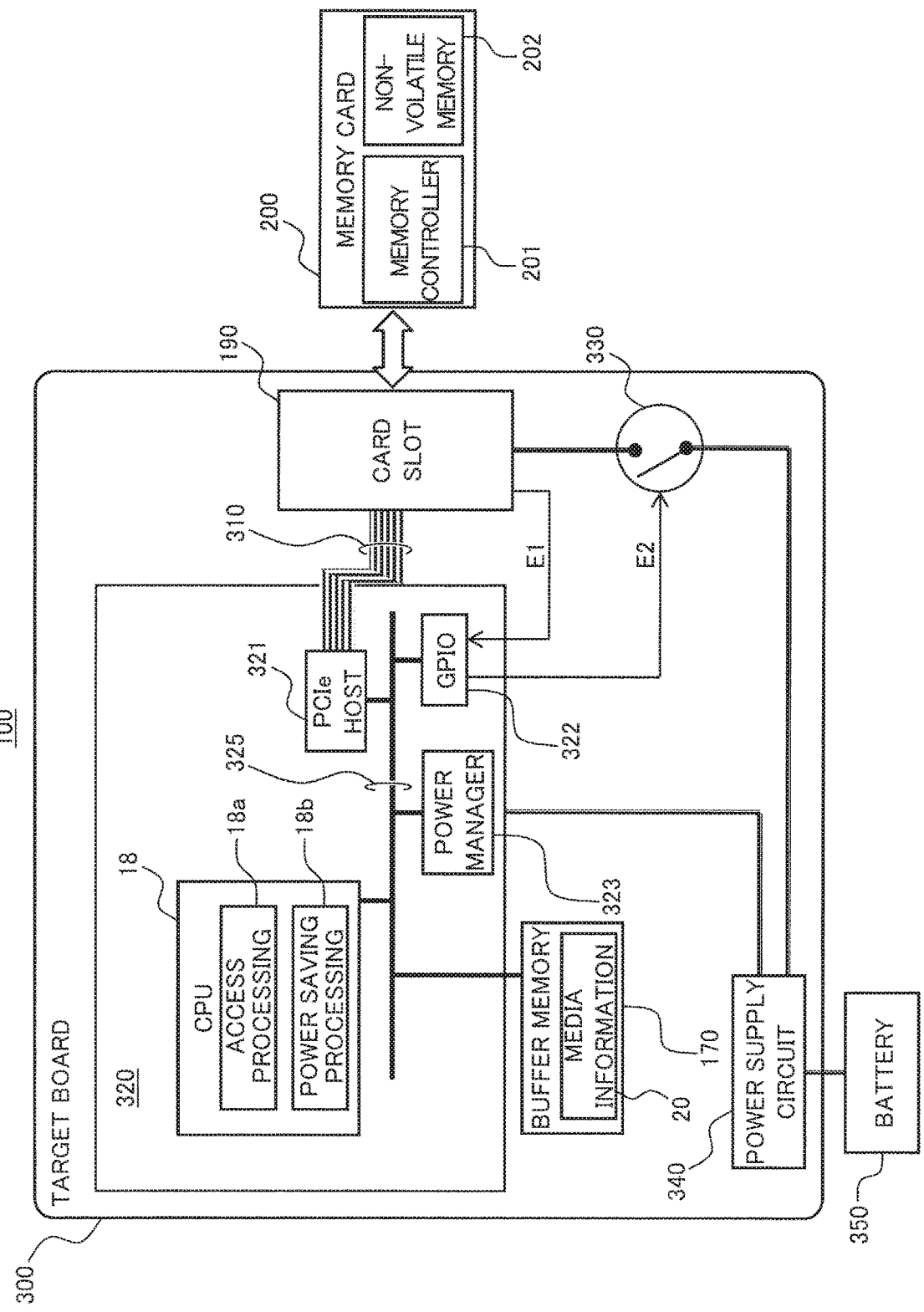
FIG. 2 shows details of a configuration of the digital camera.

FIG. 2 shows details of the configuration of the digital camera 100. The digital camera 100 includes, for example, a PCIe bus 310, an integrated circuit part 320, the card slot 190, a media power switch 330, and a power supply circuit part 340 on target board 300. Further, for example, a battery 350 can be detachably attached to the digital camera 100.

In the digital camera 100 of this embodiment, the PCIe bus 310 forms a dedicated communication path for performing data communication with the memory card 200. The PCIe bus 310 is an example of a first communication bus in this embodiment.

The integrated circuit part 320 includes, for example, a CPU 18, a PCIe host 321, a GPIO 322, a power manager 323, and an internal bus 325. The integrated circuit part 320 may further include the image processor 160, a memory, and the like. Each portion included in the integrated circuit part 320 is connected to the internal bus 325, and can perform data communication via the internal bus 325. The internal bus 325 is an example of a second communication bus in this embodiment.

The CPU 18 forms a part of the camera controller 180 (FIG. 1) in the digital camera 100. The CPU 18 includes an access processing unit 18a and a power saving processing unit 18b as functional configurations achieved by software, for example. The access processing unit 18a executes various kinds of processing of accessing the memory card 200. The power saving processing unit 18b executes processing for reducing power regarding the memory card 200 in this embodiment. The CPU 18 is an example of the processor in the digital camera 100 of this embodiment.

The buffer memory 170 stores, for example, media information 20 that is information regarding the memory card 200. The media information 20 includes, for example, a remaining data capacity of the attached memory card 200.

The PCIe host 321 is a circuit functioning as a host in data communication (i.e., PCIe communication) via the PCIe bus 310, and includes a root complex device in the PCIe standard. The PCIe host 321 is an example of a communication host in this embodiment. The PCIe host 321 is connected to both the internal bus 325 and the PCIe bus 310.

The PCIe host 321 performs various kinds of access to the memory card 200 via the PCIe bus 310, for example, under the control of the CPU 18.

The card slot 190 has a circuit configuration for connecting the attached memory card 200 to the PCIe bus 310 and outputting an attachment monitoring signal E1 that is an electrical signal for monitoring whether or not the memory card 200 is attached. Power is supplied to the card slot 190 via the media power switch 330. The card slot 190 includes, for example, a power supply terminal for supplying power to the memory card 200.

The memory card 200 includes, for example, a memory controller 201 that controls the overall operation of the memory card 200, and a nonvolatile memory 202. The memory controller 201 includes, for example, a CPU and a PCIe standard interface module (circuit). The memory controller 201 receives access via the PCIe bus 310, and controls writing/reading of data to/from the nonvolatile memory 202.

The GPIO 322 of the integrated circuit part 320 includes, for example, a plurality of input/output pins as general-purpose input/output. For example, the GPIO 322 is electrically connected to the card slot 190, and receives input of the attachment monitoring signal E1 from the card slot 190. Further, the GPIO 322 outputs, for example, a control signal E2 from the CPU 18 to the media power switch 330.

The media power switch 330 is, for example, semiconductor switch such as a transistor. The media power switch 330 is provided on, for example, a power supply line for allowing a power supply circuit part 340 provided on the target board 300 to supply power to the card slot 190, and switches a state of the power supply line between a conductive state (on state) and a cut-off state (off state). The on/off state of the media power switch 330 is controlled by the control signal E2.

The power supply circuit part 340 includes a DC/DC converter, a regulator, and the like, and supplies power from the battery 350 to each portion of the digital camera 100. In order to supply power to each portion, the power supply circuit part 340 converts a voltage supplied from the battery 350 into a voltage suitable for each portion. The power supply circuit part 340 generates, for example, a power supply voltage to be supplied to the card slot 190 and a power supply voltage to be supplied to the integrated circuit part 320.

The battery 350 is, for example, detachably attached to the digital camera 100 so as to supply power for driving the digital camera 100. The battery 350 may be, for example, a dry battery or a rechargeable battery. In place of the battery, an external apparatus such as a USB power adapter or a personal computer (PC) may convert a voltage from a commercial power supply into a voltage defined by a USB standard and supply power to the digital camera 100.

The power manager 323 in the integrated circuit part 320 manages power to be supplied to each portion of the integrated circuit part 320. For example, the power manager 323 performs switching as to whether to supply power to each portion of the integrated circuit part 320 under the control of the CPU 18. The power manager 323 has, for example, a mechanism that controls a power switch possessed by each portion of the integrated circuit part 320 by using an electrical signal.

2. Operation

Operation of the digital camera 100 configured as described above will be described below.

In generic digital camera, power of 0.5 W is consumed in a state that the memory card 200 such as an XQD card is not accessed after the memory card is inserted and the power supply is turned on. Even if the power supply of the memory card 200 is turned off in accordance with a PCIe standard procedure, merely power of 0.2 W can be reduced. Thus, it is problematic in that 60% of the above power consumption of 0.5 W cannot be reduced.

In view of this, when it is found out that no access is done with the memory card 200 being inserted, the digital camera 100 of this embodiment turns off not only the power supply on a device side of the PCIe bus 310, such as the memory card 200 and the card slot 190, but also the power supply on a host side of the PCIe bus 310 (i.e., the PCIe host 321). Thus, consumption of all the above power consumption of 0.5 W is reduced, and it is possible to reduce the overall power consumption regarding the PCIe bus in the digital camera 100.

2-1. Overall Operation

Overall operation of the digital camera 100 using the memory card 200 will be described with reference to FIG. 3.

Figure 3:
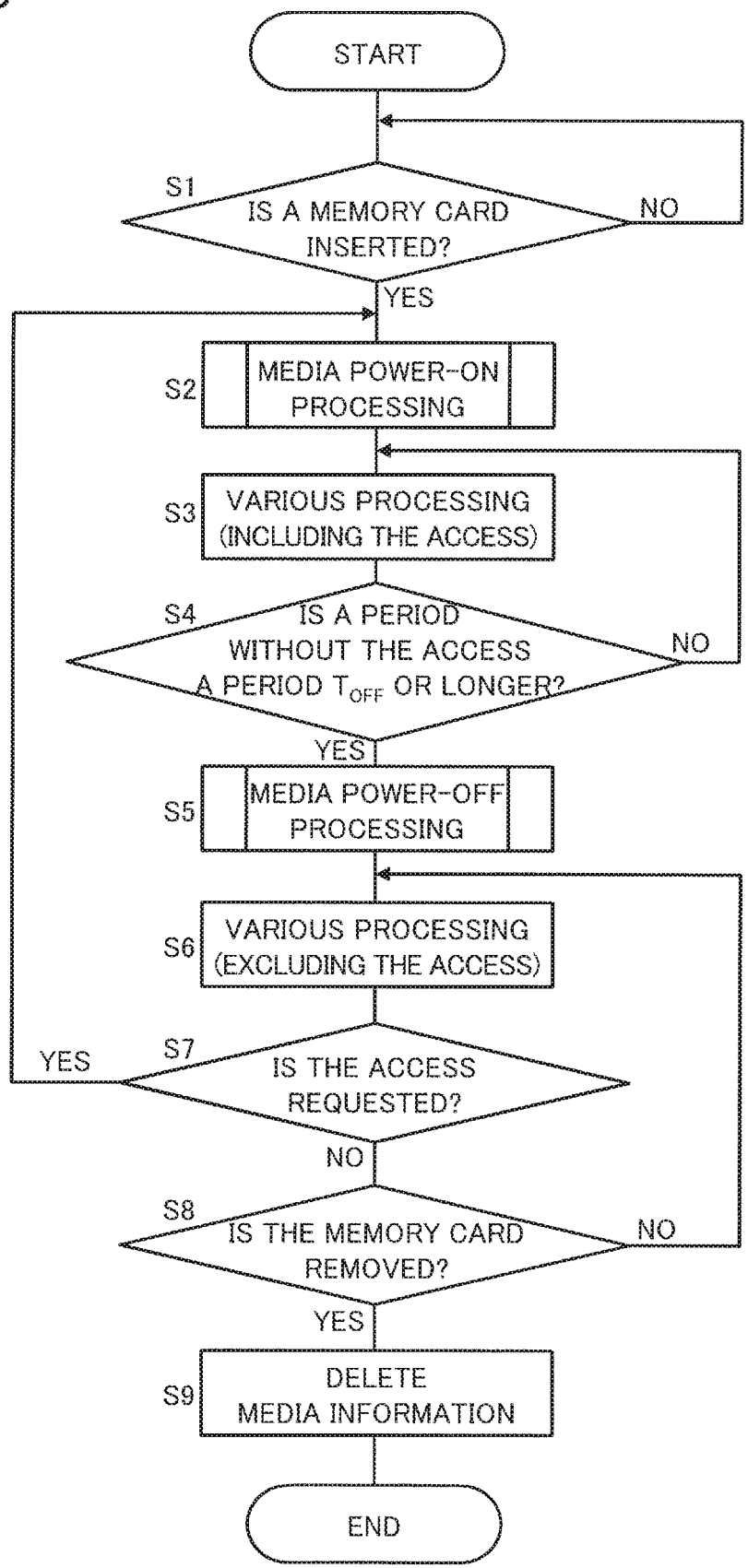
FIG. 3 is a flowchart showing operation of the digital camera using a memory card.

FIG. 3 is a flowchart showing operation of the digital camera 100 using the memory card 200. Processing shown in the flowchart of FIG. 3 starts in a state in which, for example, the predetermined memory card 200 is not inserted into the digital camera 100. At the start of this flow, for example, the power of the digital camera 100 is supplied, whereas the PCIe host 321 and the like are in a power off state. Each processing of this flow is executed by, for example, the CPU 18 in the camera controller 180 of the digital camera 100.

At first, the CPU 18 of the digital camera 100 functions as, for example, the access processing unit 18a, to detect whether or not the memory card 200 is inserted into the card slot 190 (S1). The CPU 18 detects whether or not the memory card 200 is inserted on the basis of the attachment monitoring signal E1 input from the card slot 190 to the GPIO 322. For example, when the CPU 18 detects that the memory card 200 is not inserted (NO in S1), the CPU 18 repeats the detection in step S1 as a state waiting for the memory card 200 to be inserted.

When the CPU 18 detects that the memory card 200 is inserted (YES in S1), the CPU 18 executes media power-on processing for supplying power to the memory card 200 and the like (S2). According to the media power-on processing (S2), the digital camera 100 is ready to access the memory card 200 over PCIe communication (hereinafter, referred to as "media power-on state"). In the processing in step S2, the media information 20 is acquired from the memory card 200. Details of the media power-on processing (S2) will be described below.

In the media power-on state for example, the CPU 18 performs various kinds of processing based on various functions that are executed in the digital camera 100, such as an image shooting function (S3). In the media power-on state, access to the memory card 200, such as writing and reading of data, can be executed. In step S3, the access processing unit 18a of the CPU 18 appropriately executes processing of accessing the memory card 200 via the PCIe bus 310 by using the PCIe host 321 in response to requests from various functions of the digital camera 100.

At this time, the CPU 18 also functions as the power saving processing unit 18b, and determines whether or not a period in which there is no access to the memory card 200 reaches at least a predetermined period $T_{OFF}$ (S4). For example, the power saving processing unit 18b counts a period that elapses from a timing of the last access performed by the access processing unit 18a as necessary, and compares the period with the predetermined period $T_{OFF}$. The predetermined period $T_{OFF}$ is a period set as a reference for determining whether to stop power supply to the memory card 200 and the like, and is e.g. 5 seconds. Setting of the predetermined period $T_{OFF}$ will be described below. When an access request is issued before the predetermined, period $T_{OFF}$ elapses, the determination result in step S4 is NO.

In a case where the period in which there is no access to the memory card 200 does not reach at least the predetermined period $T_{OFF}$ (NO in S4), the CPU 18 returns to step S3 and performs various kinds of processing in the media power-on state.

In a case where the period in which there is no access to the memory card 200 reaches at least the predetermined period $T_{OFF}$ (YES in S4), the CPU 18 executes media power-off processing for stopping power supply to the memory card 200 and the like (S5). According to the media power-off processing of this embodiment, not only the power supplies of the memory card 200 and the card slot 190 but also the power supply of the PCIe host 321 is turned off (hereinafter, referred to as "media power-off state"). Details of the media power-off processing (S5) will be described below.

In the media power-off state, the memory card 200 is inserted into the digital camera 100, but access to the memory card 200 via the PCIe bus 310 cannot be executed. In this state, the CPU 18 executes various kinds of processing other than access to the memory card 200 in response to requests from various functions that are currently operated in the digital camera 100 (S6) in the same way as in step S3.

At this phase, when there is a request to access the memory card 200 (YES in S7), the CPU 18 returns to, for example, step S2 to enable access to the memory card 200. The CPU 18 performs the media power-on processing again (S2) to make the PCIe bus 310 communicable, and then executes various kinds of processing according to the access request (S3). As an example of this flow, processing at image shooting will be described below.

Meanwhile, when there is no request to access the memory card 200 (NO in S7) and the memory card 200 is not removed (NO in S8), the CPU 18 continues the media power-off state and executes various kinds of processing (S6).

The CPU 18 detects whether or not the memory card 200 is removed from the card slot 190 on the basis of the attachment monitoring signal E1 input from the card slot 190 to the GPIO 322 (S8) in the same way as in, for example, S1.

When removal of the memory card 200 from the card slot 190 is detected (YES in S8), the CPU 18 deletes the media information 20 previously memorized in, for example, the buffer memory 170 (S9). Thus, the processing shown in this flowchart is terminated. For example, the CPU 18 repeatedly executes the processing shown in this flowchart at predetermined cycle.

According to the above operation of the digital camera 100, when the memory card 200 is not accessed for the predetermined period $T_{OFF}$ or longer (YES in S4), the media power-off processing (S5) is performed, and the portions of the digital camera 100 sequentially transition to the media power-off state. As a result, frequent power saving can be achieved in the digital camera 100 into which the memory card 200 is inserted. At this time, not only power of the memory card 200 and the card slot 190 but also power of the PCIe host 321 can be reduced. This can achieve significant power saving.

Further, heat generation in a state in which power is supplied can be suppressed according to reduced power, which is also useful as a countermeasure against heat generation in the digital camera 100. Furthermore, improvement in the number of frames of CIPA in the digital camera 100 at the time of inserting the memory card 200 can also be expected.

2-1-1. Media Power-On Processing

Details of the power-on processing in step S2 of FIG. 3 will be described with reference to FIG. 4.

Figure 4:
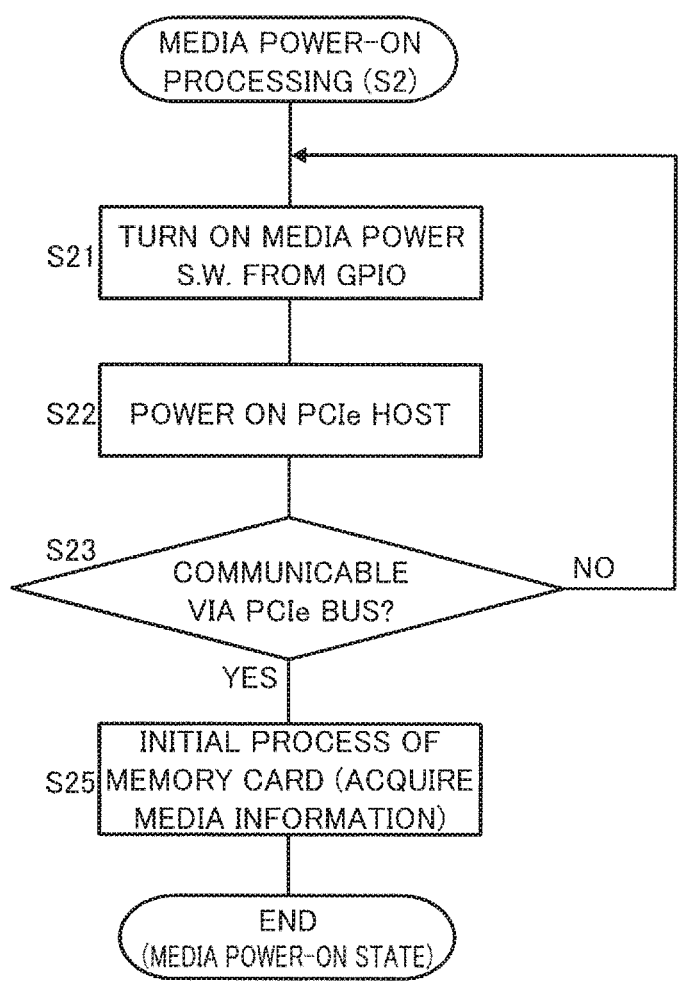
FIG. 4 is a flowchart showing media power-on processing of the digital camera.

FIG. 4 is a flowchart showing the media power-on processing (S2 in FIG. 3) of the digital camera 100. Each processing shown in this flowchart is executed by, for example, the CPU 18 functioning as the access processing unit 18a. The processing of this flow starts in a state of the digital camera 100 that the media power switch 330 (see FIG. 2) is in the off state (i.e., the shut-off state) and the power supply of the PCIe host 321 is in the off state.

At first, the CPU 18 outputs the control signal E2 from the GPIO 322 so as to control the media power switch 330 from the off state to the on state (i.e., the conductive state) (S21). As a result, the power supply circuit part 340 (see FIG. 2) and the card slot 190 are electrically connected via the media power switch 330, and thus power can be physically supplied.

Further, the CPU 18 performs control to turn on the power supply of the PCIe host 321 (S22). For example, the CPU 18 outputs an instruction to start power supply to the PCIe host 321 to the power manager 323 via the internal bus 325. The power manager 323 switches the power supply of the PCIe host 321 from off to on.

Next, the CPU 18 determines whether or not communication connection is established between the PCIe host 321 and the memory card 200 via the PCIe bus 310 (S23). With this establishment of the communication connection, data communication can be performed between the PCIe host 321 and the memory card 200. The determination in step S23 is performed by, for example, trying to access the memory card 200 from the PCIe host 321.

When the CPU 18 determines that the communication connection via the PCIe bus 310 is not established (NO in S23), the CPU 18 performs control to turn off the power supply of the PCIe host 321 and turn off the media power switch 330. Then, the CPU 18 performs the processing in and after step S21 again. In this way, establishment of the communication connection via the PCIe bus 310 is retried. Note that, when the number of times the processing in steps S21 to S23 is repeated exceeds a predetermined number (e.g., 3 times), for example, the CPU 18 terminates the media power-on processing (S2) as an error state. In this case, the processing does not proceed to step S3 in FIG. 3, and returns to, for example, step S1.

When the CPU 18 determines that the communication connection via the PCIe bus 310 is established (YES in S23), the CPU 18 performs various kinds of initial processing of the memory card 200 by using the PCIe host 321 over data communication via the PCIe bus 310 (S25). At this time, the CPU 18 acquires, from the memory card 200, the media information 20 including a remaining capacity capable of recording data. The CPU 18 stores the acquired media information 20 in, for example, the buffer memory 170.

After the initial processing of the memory card 200 (S25), the CPU 18 terminates the media power-on processing. The CPU 18 proceeds from step S2 to step S3 in FIG. 3.

According to the above media power-on processing (S2 in FIG. 3), the latest media information can be acquired from the memory card 200 (S25) upon insertion of the memory card 200 (YES in S1), for example. Further, when responding to an access request in the media power-off state (YES in S7), the digital camera 100 can be returned to the media power-on state by the similar processing to the processing performed when the memory card 200 is inserted.

2-1-2. Media Power-Off Processing

Details of the power-off processing in step S5 of FIG. 3 will be described with reference to FIG. 5.

Figure 5:
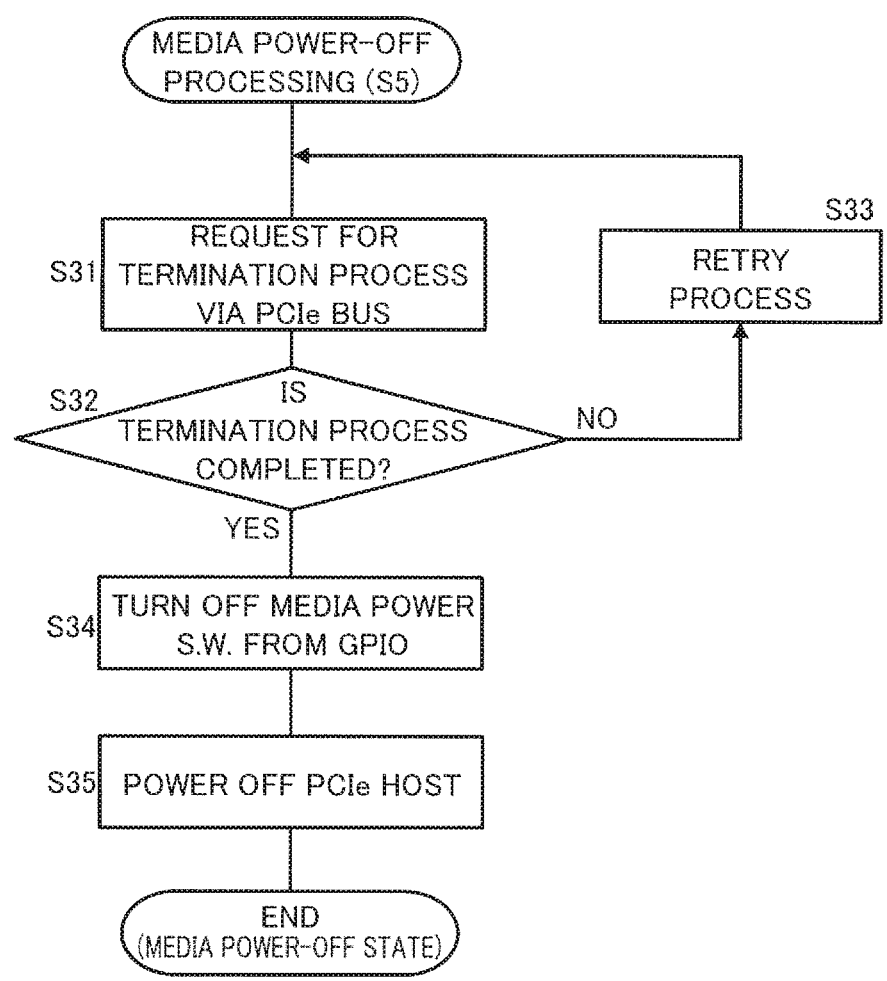
FIG. 5 is a flowchart showing media power-off processing of the digital camera.

FIG. 5 is a flowchart showing the media power-off processing (S5 in FIG. 3) of the digital camera 100. Each processing shown in this flowchart is executed by, for example, the CPU 18 functioning as the access processing unit 18a and the power saving processing unit 18b. The processing of this flow starts when the digital camera 100 is in the media power-on state.

At First, the CPU 18 transmits a request for termination processing for terminating the communication connection with the digital camera 100 to the memory card 200 from the PCIe host 321 via the PCIe bus 310 (S31).

The CPU 18 determines whether or not the termination processing of the memory card 200 is completed by using, for example, communication via the PCIe bus 310 (S32). For example, the memory controller 201 of the memory card 200 transmits, to the PCIe host 321, a notification that the termination processing cannot be executed in such a case. In this case, the CPU 18 determines that the termination processing of the memory card 200 is not completed (NO in S32). As retry processing (S33), the CPU 18 waits for a predetermined period, and then executes the processing in step S31 again.

When the CPU 18 determines that the termination processing of the memory card 200 is completed (YES in S32), the CPU 18 outputs the control signal E2 from the GPIO 322 so as to turn off the media power switch 330 (S34).

Next, the CPU 18 performs control to turn off the power supply of the PCIe host 321 (S35). For example, the CPU 18 outputs an instruction to stop power supply to the PCIe host 321 to the power manager 323 via the internal bus 325. The power manager 323 selectively stops power supply to the PCIe host 321 while maintaining power that is currently supplied to the portions whose power is managed by the power manager 323 other than the PCIe host 321, for example.

After the power supply of the PCIe host 321 is turned off (S35), the CPU 18 terminates step S5 in FIG. 3 and proceeds to step S6.

According to the above media power-off processing (S5 in FIG. 3), it is possible to achieve the media power-off state in which power can be reduced on both sides of the PCIe bus 310. At this time, in the digital camera 100, PCIe communication cannot be performed, but data communication via the internal bus 325 or the like can be kept executable.

2-2. Image Shooting Operation

Even in a case where instruction to shoot an image is issued in the above media power-off state, in which the power supply is off regarding the PCIe bus 310 entirely, the digital camera 100 of this embodiment can execute image shooting operation as in the case of the media power-on state. An example of this operation will be described with reference to FIG. 6.

Figure 6:
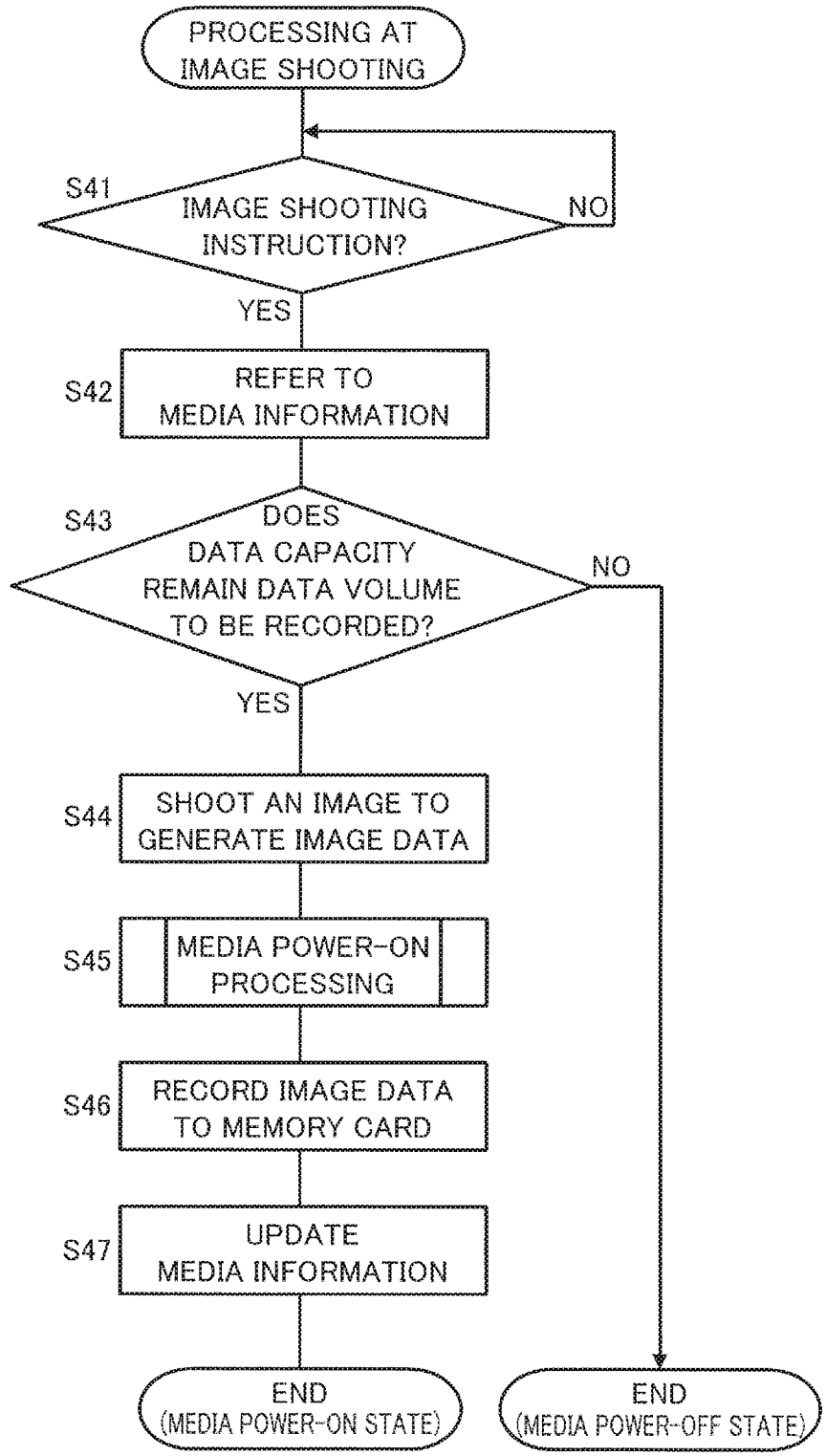
FIG. 6 is a flowchart showing image shooting operation of the digital camera.

FIG. 6 is a flowchart showing image shooting operation of the digital camera 100. The processing shown in the flowchart of FIG. 6 starts when the digital camera 100 is in the media power-off state. Each processing shown in this flowchart is executed by, for example, the CPU 18 of the camera controller 180 in the digital camera 100.

The CPU 18 receives input of an image shooting instruction to instruct the digital camera to shoot an image, such as user operation of pressing a release button on the operation member 210 (S41). For example, the CPU 18 periodically performs the determination in step S41 until the image shooting instruction is input (NO in S41).

For example, when the image shooting instruction is input (YES in S41), the CPU 18 refers to the media information 20 stored in the buffer memory 170 (S42). The media information 20 in the buffer memory 170 is acquired in step S25 of the last power-on processing (FIG. 4), and is managed to be appropriately updated in the subsequent processing.

Based on the media information 20 managed in the buffer memory 170, the CPU 18 determines whether or not the remaining data capacity of the memory card 200 indicated by the media information 20 is equal to or larger than a data volume of image data to be recorded in response to the image shooting instruction (S43). The determination in step S43 is performed for checking whether or not the image data captured in response to the image shooting instruction can be recorded on the memory card 200.

In a case where the CPU 18 determines that the remaining capacity of the memory card 200 is equal to or larger than the data volume of the image data (YES in S43), the CPU 18 performs various kinds of image shooting control to generate image data as an shooting result (S44). The generated image data is temporarily memorized in the buffer memory 170.

The CPU 18 executes the media power-on processing (S45) in the same way as in, for example, step S2 in FIG. 3. The processing in step S45 is similar to, for example, the processing shown in the flowchart of FIG. 4. According to this processing, the PCIe host 321 is activated together with the memory card 200 and the like, and thus the memory card 200 can be accessed via the PCIe bus 310.

Next, the CPU 18 functioning records the generated image data on the memory card 200 by using the PCIe host 321 as the access processing unit 18a, for example (S46). Specifically, the CPU 18 performs processing of causing the PCIe host 321 to access the memory card 200 via the PCIe bus 310 so as to write the image data memorized in the buffer memory 170 to the memory card 200.

Further, the CPU 18 updates the media information 20 stored in the buffer memory 170 in accordance with the recording of the image data on the memory card 200 (S47). Specifically, the CPU 18 subtracts the data volume of the written image data from the remaining capacity of the media information 20. With this, the latest remaining capacity of the memory card 200 can be managed.

After updating the media information 20 (S47), the CPU 18 terminates the processing shown in this flowchart. In this case, the digital camera 100 is in the media power-on state because of the processing in step S45. Then, the CPU 18 proceeds to step 94 of FIG. 3, for example.

Meanwhile, in a case where the CPU 18 determines that the remaining capacity of the memory card 200 is less than the data volume of the image data caused by the image shooting instruction on the basis of the media information 20 managed in the buffer memory 170 (NO in S43), the CPU 18 terminates the processing of this flow, without performing the processing in and after step S43. In this case, the digital camera 100 is maintained in the media power-off state. Then, the CPU 18 proceeds to NO in step S7 of FIG. 3, for example.

According to the above image shooting operation, even if an image shooting instruction is input in the media power-off state (YES in S41), it is possible to refer to the media information 20 managed in advance in the buffer memory 170 (S42) to check whether or not the image data caused by the image shooting instruction can be recorded on the memory card 200 (S43).

Therefore, in the case where the shooting result can be recorded (YES in S43), performing shooting of the image (S44) while transitioning to the medium power-on state (S45), the digital camera 100 can write the image data that is the shooting result to the memory card 200 (S46). Meanwhile, in the case where the shooting result cannot be recorded (NO in S43), the media power-off state can be maintained.

Hereinabove, an example of the operation performed in the case where the image shooting instruction is input in the media power-off state has been described. In a case where the image shooting instruction is input in the media power-on state, for example, the CPU 18 omits step S45 in FIG. 6 and performs processing similar to the processing described above. For example, in a case where the digital camera 100 performs continuous shooting, the processing in each state can be applied in an appropriate combination as the predetermined period $T_{OFF}$ elapses.

2-3. Setting of Predetermined Period $T_{OFF}$

Figure 7:
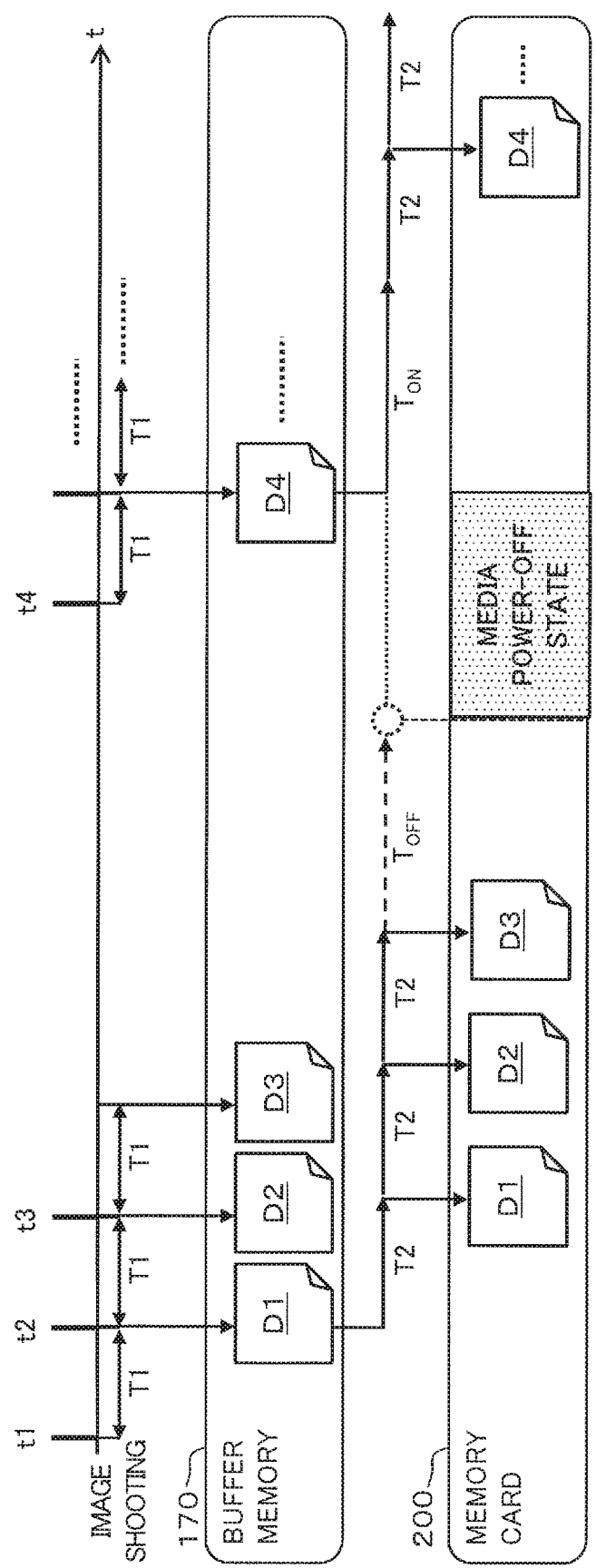
FIG. 7 is a diagram for illustrating continuous shooting by the digital camera and a media power-off state.

Setting of the predetermined period $T_{OFF}$ performed when the digital camera 100 of this embodiment transitions to the media power-off state will be described with reference to FIG. 7. FIG. 7 is a diagram for illustrating continuous shooting by the digital camera 100 and the media power-off state.

FIG. 7 shows operation timings at which the digital camera 100 performs image shooting operation in a continuous shooting mode. The continuous shooting mode is, for example, an operation mode in which shooting of the image is performed at continuous shooting intervals T1 in a period in which the release button is continuously pressed. The continuous shooting interval T1 is a time interval from $\frac{1}{10}$ to $\frac{1}{50}$ seconds for example, and is e.g. T1=111 milliseconds.

In the example of FIG. 7, the digital camera 100 performs shooting of the image at times t1, t2, and t3 at the continuous shooting intervals T1, and generates a plurality of pieces of image data D1, D2, and D3. Each of pieces of the image data D1, D2, and D3 is temporarily memorized in the buffer memory 170, and is finally stored in the memory card 200. A writing period T2 is a period taken for writing one piece of image data from the buffer memory 170 to the memory card 200. The writing period T2 is defined depending on a writing speed of the memory card 200 and a data volume of the image data, and is e.g. T2=121 milliseconds.

In this embodiment, the predetermined period $T_{OFF}$ is set so as to avoid a situation that the above operation of transitioning to the media power-off state (steps S4 and S5 in FIG. 3) would block such continuous image shooting operation. For example, in a case where the transition to the media power-off state immediately occurs after the image data captured at the time t1 is recorded on the memory card 200, return to the media power-on state would be requested instantaneously in order to record the image data continuously captured at the subsequent time t2. If such a situation is repeated, a time period $T_{ON}$ for returning would be taken many times. This would exceedingly increase time to complete recording of the image data in the continuous shooting.

In order to avoid the situation, the predetermined period $T_{OFF}$ is set to be longer than the continuous shooting interval T1 (e.g., $T_{OFF}$>111 milliseconds) in the digital camera 100 of this embodiment. Thus, the digital camera 100 can be maintained in the media power-on state during, for example, continuous shooting from the time t1 to the time t3 shown in FIG. 7. When the continuous shooting is finished and the predetermined period $T_{OFF}$ elapses, the digital camera 100 transitions to the media power-off state. Therefore, reduction in power consumption of the digital camera 100 can be realized.

In addition, when an image shooting instruction is issued again at a time t4 shown in FIG. 7, the media power-on processing (S45 in FIG. 6) is executed. Then, image data D4 can be continuously written after the period $T_{ON}$. Therefore, it is possible to achieve both reduction in power consumption and suppression of delay of operation time for continuous shooting or the like. The predetermined period $T_{OFF}$ may be set to be longer than the writing period T2.

3. Summary

As described above, the digital camera 100 of this embodiment is an example of the imaging apparatus that captures a subject image and records image data on the memory card 200 that is an example of the recording medium. The digital camera 100 includes the card slot 190 that is an example of the recording medium connector, the PCIe host 321 that is an example of the communication host, and the CPU 18 that is an example of the processor. The memory card 200 is detachably attached to the card slot 190. The PCIe host 321 is connected to the card slot 190 via the PCIe bus 310 that is an example of the first communication bus, and accesses the memory card 200 via the PCIe bus 310 to write/read data to/from the memory card 200. The CPU 18 controls power supply. In a case where the period in which the PCIe host 321 does not access the memory card 200 is equal to or longer than the predetermined period $T_{OFF}$ (YES in S4), the CPU 18 stops power supply to the memory card 200 and the card slot 190 by the media power-off processing (S31 to S34), and also stops power supply to the PCIe host 321 (S35).

According to the digital camera 100 described above, when the memory card 200 is not accessed for the predetermined period $T_{OFF}$ or longer (YES in S4), not only the power supplies of the memory card 200 and the card slot 190 but also the power supply of the PCIe host 321 is turned off. Thus, the entire power consumption regarding the PCIe bus 310 can be reduced. As described above, it is possible to reduce power consumed in the digital camera 100 to which the memory card 200 is attachable.

In the digital camera 100 of this embodiment, the CPU 18 performs data communication with the PCIe host 321 via the internal bus 325 that is an example of the second communication bus different from the PCIe bus 310. The PCIe bus 310 is a dedicated bus for performing data communication with the memory card 200 in the digital camera 100. In the media power-off state, the digital camera 100 can execute operation other than access to the memory card 200.

In the digital camera 100 of this embodiment, the predetermined period $T_{OFF}$ is longer than the continuous shooting interval at which image data is shot continuously. Thus, it is possible to prevent transition to the media power-off state from interfering with image shooting operation such as continuous shooting, and thus it is possible to achieve both reduction in power consumption of the digital camera 100 and suppression of delay of operation time.

In the digital camera 100 of this embodiment, in a case where the period in which the PCIe host 321 does not access the memory card 200 is less than the predetermined period $T_{OFF}$ (NO in S4), the CPU 18 returns to step S3 and continuously supplies power to the memory card 200, the card slot 190, and the PCIe host 321. Therefore, in a case where the memory card 200 is accessed at intervals, each of which is less than the predetermined period $T_{OFF}$, the memory power-on state is continued, and delay of operation time can be suppressed.

In this embodiment, the digital camera 100 further includes the buffer memory 170 as the memory that stores the media information 20 that is an example of the information including the remaining data capacity of the memory card 200. When the CPU 18 is instructed to shoot image data in a state in which the power supply to the memory card 200, the card slot 190, and the PCIe host 321 is stopped (YES in S41), the CPU 18 refers to the media information 20 stored in the buffer memory 170 (S42). In a case where the remaining capacity indicated by the media information 20 is less than the data volume of the image data (NO in S43), the CPU 18 continues the state in which the power supply is stopped, without performing the instructed shooting. In a case where the remaining capacity indicated by the media information 20 is equal to or larger than the data volume of the image data (YES in S43), the CPU 18 performs the instructed shooting (S44), starts the power supply (S45), and records the image data on the memory card 200 (S46). Thus, even in a case where an instruction to perform shooting is issued in the media power-off state, it is possible to perform image shooting operation as in the case of the media power-on state.

In the digital camera 100 of this embodiment, the PCIe bus 310 that is an example of the first communication bus is a bus conforming to the PCI Express standard. The PCIe host 321 that is an example of the communication host is a root complex device in the PCI Express standard. When the digital camera 100 transitions to the media power-off state, it is possible to reduce power consumption of the entire PCIe communication in the digital camera 100.

Other Embodiments

As described above, the first embodiment has been described as an example of the technique disclosed in the present application. However, the technique in the present disclosure is not limited thereto, and is also applicable to embodiments in which changes, substitutions, additions, omissions, and the like are made as appropriate. It is also possible to form a new embodiment by combining components described in the above embodiments. Hereinafter, other embodiments will be exemplified.

The first embodiment describes the configuration of the digital camera 100 to which a single memory card 200 is attachable, but a plurality of memory cards may be attachable. This modification will be described with reference to FIGS. 8 and 9.

Figure 8:
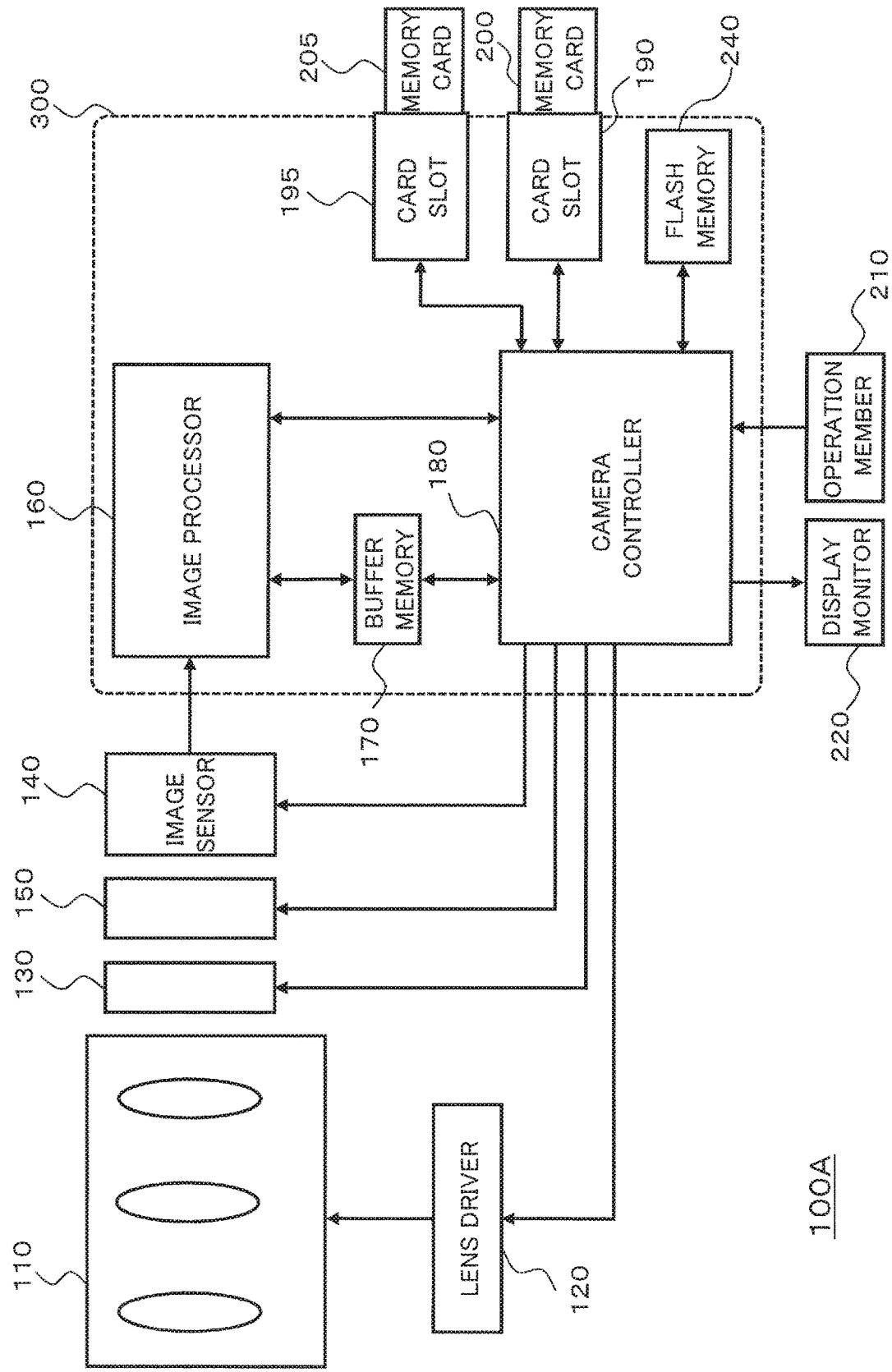
FIG. 8 shows a first modification of the configuration of the digital camera.

FIG. 8 shows a configuration of a digital camera 100A according to a first modification. In this embodiment, the digital camera 100A may further include, for example, a card slot 195 to which a memory card 205 is attachable, the memory card 205 being of a different type from the memory card 200 similar to that in the first embodiment. For example, the card slot 195 adopts a communication bus separated from the communication bus for the card slot 190 similar to that in the first embodiment. According to this modification, in a case where one memory card 200 is accessed but the other memory card 205 is not accessed for example, the communication bus for accessing the memory card 205 can transition to the media power-off state similar to that in the first embodiment.

FIG. 9 shows a configuration of a digital camera 100B according to a second modification. Alternatively or additionally to the above example, the digital camera 100B of this embodiment may include card slots 190A and 190B to which a plurality of memory cards 200A and 200B is attachable with the same communication bus. In FIG. 9, both the card slots 190A and 190B are connected to the PCIe bus 310. In this modification, the determination result in step S4 in FIG. 3 is NO as long as one of the memory cards 200A and 200B is accessed within the predetermined period $T_{OFF}$.

In the above embodiments, the PCIe bus 310 has been described as an example of the first communication bus. In this embodiment, the first communication bus is not limited to the PCIe bus 310, and may be a communication bus conforming to another communication standard that enables data communication with a recording medium such as the memory card 200. The memory card 200 is not necessarily limited to the above example, and may be, for example, an SDexpress card or an SD card. The card slot 190 adopts a data transfer interface of a communication standard compatible with the memory card 200.

In the above embodiments, the memory card 200 has been exemplified as an example of the recording medium that is attachable to the digital camera 100. In this embodiment, the digital camera 100 adopts not only the memory card 200 but also various types of removable media as a recording medium to be reduced in power consumption. Also in this embodiment, the same effect as that in the first embodiment can be obtained by stopping power supply to the entire communication bus used for the access when the digital camera does not access the various types of removable media for the predetermined period $T_{OFF}$ or longer.

In the above embodiments, a digital camera has been described as an example of the imaging apparatus, but the present disclosure is not limited thereto. The imaging apparatus of the present disclosure may be an electronic device (e.g., a video camera, a smartphone, a tablet computer, or the like) having an image shooting function. The idea of the present disclosure is not necessarily applicable only to the imaging apparatus, and is also applicable to various electronic devices.

As described above, the embodiments have been described as examples of the technique in the present disclosure. For this purpose, the accompanying drawings and the detailed description are provided.

Thus, in order to describe the above technique, the components described in the accompanying drawings and the detailed description may include not only components essential for solving the problem, but also components not essential for solving the problem. Therefore, those non-essential components should not be immediately recognized to be essential just because those non-essential components are described in the accompanying drawings and the detailed description.

Further, the above embodiments are for describing the technique in the present disclosure, and thus it is possible to perform various changes, substitutions, additions, omissions, and the like within the scope of claims or its equivalent range.

The present disclosure is applicable to various imaging apparatuses to which a recording medium is detachable.

The invention claimed is:

1. An imaging apparatus for capturing a subject image and recording image data on a recording medium, the imaging apparatus comprising:
   a recording medium connector configured to attach the recording medium detachably;
   a communication host connected to the recording medium connector via a first communication bus, configured to access the recording medium via the first communication bus to write data to the recording medium or read data from the recording medium; and a processor configured to control power supply, wherein in a case where a period in which the communication host does not access the recording medium is equal to or longer than a predetermined period, the processor stops power supply to the recording medium and the recording medium connector, and stops power supply to the communication host, while at a same time power supply to another portion of the imaging apparatus remains available such that image shooting operation of the imaging apparatus can perform while power supply to the recording medium, the recording medium connector, and the communication host is stopped.

2. The imaging apparatus according to claim 1, wherein the processor performs data communication with the communication host via a second communication bus different from the first communication bus.

3. The imaging apparatus according to claim 1, wherein the first communication bus is a dedicated bus to perform data communication with the recording medium in the imaging apparatus.

4. The imaging apparatus according to claim 1, wherein the predetermined period is longer than a continuous shooting interval at which the image data is shot continuously.

5. The imaging apparatus according to claim 1, wherein in a case where the period in which the communication host does not access the recording medium is less than the predetermined period, the processor continuously supplies power to the recording medium, the recording medium connector, and the communication host.

6. The imaging apparatus according to claim 1, further comprising
a memory configured to store information including a remaining data capacity of the recording medium, wherein
the processor refers to the information stored in the memory when shooting of the image data is instructed in a state in which the power supply to the recording medium, the recording medium connector, and the communication host is stopped, wherein
in a case where the remaining capacity indicated by the information is less than a data volume of the image data, the processor continues the state in which the power supply is stopped without performing the instructed shooting, and
in a case where the remaining capacity indicated by the information is equal to or larger than the data volume of the image data, the processor performs the instructed shooting, starts the power supply, and records the image data on the recording medium.

7. The imaging apparatus according to claim 1, wherein:
the first communication bus is a bus conforming to a PCI Express standard; and
the communication host is a root complex device in the PCI Express standard.

8. An imaging apparatus for capturing a subject image and recording image data on a recording medium, the imaging apparatus comprising:
a recording medium connector configured to attach the recording medium detachably;
a communication host connected to the recording medium connector via a first communication bus, configured to access the recording medium via the first communication bus to write data to the recording medium or read data from the recording medium; and
a processor configured to control power supply, wherein:
in a case where a period in which the communication host does not access the recording medium is equal to or longer than a predetermined period, the processor stops power supply to the recording medium and the recording medium connector and stops power supply to the communication host, while at a same time power supply to another portion of the imaging apparatus remains available such that image shooting operation of the imaging apparatus can perform while power supply to the recording medium, the recording medium connector, and the communication host is stopped; and
the predetermined period is longer than a continuous shooting interval at which the image data is shot continuously.

9. An imaging apparatus for capturing a subject image and recording image data on a recording medium, the imaging apparatus comprising:
a recording medium connector configured to attach the recording medium detachably;
a communication host connected to the recording medium connector via a first communication bus, configured to access the recording medium via the first communication bus to write data to the recording medium or read data from the recording medium; and
a processor configured to control power supply, wherein
in a case where a period in which the communication host does not access the recording medium is equal to or longer than a predetermined period, the processor stops power supply to the recording medium and the recording medium connector, and stops power supply to the communication host, with power supply to another portion of the imaging apparatus being kept to be capable of requesting that the communication host access to the recording medium.

10. The imaging apparatus according to claim 9, wherein in the case where the period in which the communication host does not access the recording medium is equal to or longer than a predetermined period, and the processor stops power supply to the recording medium and the recording medium connector, and stops power supply to the communication host, power supply is kept to a further portion of the imaging apparatus which causes access processing to the recording medium in response to receiving a request from the another portion.

* * * * *